(12) United States Patent
Cho

(10) Patent No.: US 6,263,115 B1
(45) Date of Patent: Jul. 17, 2001

(54) METHOD AND APPARATUS FOR ENCODING A BINARY SHAPE SIGNAL

(75) Inventor: Sung-Ryul Cho, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/217,605

(22) Filed: Dec. 22, 1998

(30) Foreign Application Priority Data

Feb. 24, 1998 (KR) .................................................. 98-14639

(51) Int. Cl.[7] .................................................. G06K 9/36
(52) U.S. Cl. ...................... 382/243; 382/247; 375/240.08
(58) Field of Search .................................. 382/236, 243, 382/247; 341/107; 258/426, 429, 430, 261.2; 375/240.08, 240.16; 348/416.1, 417.1, 418.1

(56) References Cited

U.S. PATENT DOCUMENTS

| | | | |
|---|---|---|---|
| 5,422,734 | * 6/1995 | Kang | 382/232 |
| 5,841,900 | * 11/1998 | Yokoyama | 382/243 |
| 5,880,688 | 3/1999 | Rust . | |
| 5,933,105 | * 8/1999 | Cho | 341/107 |
| 5,974,184 | * 10/1999 | Eifrig et al. | 382/236 |
| 6,108,449 | * 8/2000 | Sekiguchi et al. | 382/236 |
| 6,133,955 | * 10/2000 | Han | 382/238 |

OTHER PUBLICATIONS

Ostermann "Coding of arbitrarily shaped objects with binary and greyscale alpha–maps: what can MPEG–4 do for you?" Proc. of the 1998 IEEE international Symposium on Circuits and Systems, vol. 5, pp273–276, Jun. 1998.*

* cited by examiner

Primary Examiner—Jon Chang
Assistant Examiner—Jingge Wu
(74) Attorney, Agent, or Firm—Pennie & Edmonds LLP

(57) ABSTRACT

An apparatus encodes a binary shape signal by using a zig-zag scanning technique. The apparatus zig-zag scans the binary shape signal to thereby output each of the pixels in the binary shape signal sequentially in order of scanning. Then, a context corresponding to each of the pixels is selected from pixels processed prior to said each of the pixels by taking the scanning order into account. By using the context of said each of the pixels, the apparatus ciphers a context number corresponding to said each of the pixels and detects its probability based on the corresponding context number. Through the above procedure, if the probabilities for all of the pixels in the binary shape signal are detected, the apparatus arithmetically encodes the binary shape signal by using the detected probabilities to thereby produce the encoded binary shape signal.

2 Claims, 6 Drawing Sheets

METHOD AND APPARATUS FOR ENCODING A BINARY SHAPE SIGNAL

FIELD OF THE INVENTION

The present invention relates to a video encoding system; and, more particularly, to a method and apparatus for enhancing a coding efficiency of a binary shape signal by selecting a more appropriate context based on a zig-zag scanning technique.

DESCRIPTION OF THE PRIOR ART

A binary shape signal, representing the location and shape of an object, can be expressed as a binary alpha block (BAB) of, e.g., 16×16, binary pixels within a frame or a video object plane (VOP), wherein each binary pixel has a binary value, e.g., 0 or 1, representing either a background pixel or an object pixel. A BAB can be encoded by using a conventional bit-map-based shape coding method such as a context-based arithmetic encoding (CAE) method.

For instance, for an intra-frame, a current BAB is encoded by using a conventional intra-CAE method, wherein each pixel in the current BAB is arithmetically coded based on an intra-context comprised of a set of pixels selected from a current frame. In other words, when encoding the current BAB, pixels from neighboring BAB's are used to make up the intra-context. A border of width 2 around the current BAB is used as depicted in FIG. 5 in order to provide a current bordered BAB. In FIG. 5, the pixels in the light grey area of the current bordered BAB are the part of the current BAB to be encoded and the pixels in the dark area of the current bordered BAB are the border pixels. These are obtained from previously encoded and reconstructed BAB's except for those marked '0' which are unknown at a decoding time. Based on the current bordered BAB, the intra-context is selected as shown in FIG. 4A. Therefore, in FIG. 4A, a shaded pixel, i.e., a pixel in the current BAB, is encoded by using its intra-context 10, e.g., C0 to C9.

For an inter-frame, the current BAB may be coded by using either the intra-CAE or an inter-CAE technique depending on whichever CAE technique between the two generates a less amount of encoded data. According to the inter-CAE technique, an error representing a difference between the current BAB and each of predetermined candidate BAB's thereof included in a previous frame is calculated first and a most similar candidate BAB and a motion vector are found by a motion estimation technique, wherein the most similar candidate BAB represents a candidate BAB generating a least error among the candidate BAB's and the motion vector denotes a displacement between the current BAB and the most similar candidate BAB. Thereafter, each pixel in the current BAB is arithmetically coded based on an inter-context and a motion vector difference (MVD) representing a difference between the motion vector and a motion vector predictor (MVDP) thereof is encoded by using, e.g., a variable length coding (VLC) scheme. Referring to FIG. 4B, the inter-context is composed of two subsets of pixels, a first subset of pixels 20A, e.g., C0 to C3 in FIG. 4B, being selected from pixels in the current frame in a similar manner to what is used in the intra-CAE and a second subset of pixels 20B, e.g., C4 to C8 in FIG. 4B, being chosen from the previous frame based on the motion vector. Namely, a border of width 1 around a motion compensated BAB, detected from the previous frame by using the motion vector, is utilized to supply a bordered motion compensated BAB as described in FIG. 6. In FIG. 6, the light grey area corresponds to the motion compensated BAB and the dark area corresponds to the border. Once the bordered motion compensated BAB is determined, the second subset of pixels 20B containing the binary pixels C4 to C8 is selected from the bordered motion compensated BAB, wherein the pixel position of the pixel C6 is identical to that of the shaded pixel in the first subset 20A.

Accordingly, either the intra-context or the inter-context is selected as illustrated above and a context number of the shaded pixel in the current BAB is calculated based on its corresponding context. Once the context number of the shaded pixel is ciphered, a probability corresponding to the context number is detected from a probability table containing predetermined probabilities assigned to various context numbers and the detected probability is arithmetically encoded to thereby produce an encoded binary shape signal. Further details of the CAE techniques and the MVD can be found in MPEG-4 Video Verification Model Version 7.0, International Organization for Standardization, Coding of Moving Pictures and Associated Audio Information, ISO/IEC JTC1/SC29/WG11 MPEG97/N1642, Bristol, April 1997.

Since, however, in the conventional CAE technique, each of the pixels in the current BAB is encoded along a horizontal scanning order, the context is determined by mainly considering horizontal correlation between the pixels in the current BAB. Therefore, it is desired to select an appropriate context by taking vertical correlation together with the horizontal correlation between the pixels in the current BAB into consideration to thereby enhance the coding efficiency of the binary shape signal.

SUMMARY OF THE INVENTION

It is, therefore, a primary object of the present invention to provide a method and apparatus for encoding a binary shape signal by using a more appropriate context determined based on a zig-zag scanning technique in order to improve a coding efficiency of the binary shape signal.

In accordance with one aspect of the present invention, there is provided a method for encoding a binary shape signal including a plurality of binary blocks, each binary block having a multiplicity of pixels and each pixel having one of two different binary values, comprising the steps of:

(a) zig-zag scanning a current binary block to provide a target pixel being one of the pixels in the current binary block;

(b) determining a context corresponding to the target pixel from pixels processed prior to the target pixel by considering the scanning result;

(c) calculating a context number of the target pixel based on the context;

(d) finding a probability of the target pixel by using the context number;

(e) repeating the steps (a) to (f) until probabilities for all of the pixels in the current binary block are found; and (f) arithmetically encoding the current binary block by using the probabilities for all of the pixels to thereby produce the encoded binary shape signal.

In accordance with another aspect of the present invention, there is provided an apparatus for encoding a binary shape signal including a plurality of binary blocks, each binary block having a multiplicity of pixels and each pixel having one of two different binary values, which comprises:

a scanning block for zig-zag scanning a current binary block and outputting each of the pixels in the current binary block in the scanning order;

a context determination block for selecting a context corresponding to said each of the pixels from pixels processed prior to said each of the pixels by regarding the scanning order;

a context number calculation block for ciphering a context number of said each of the pixels by using the corresponding context; and a coding block for detecting a probability of said each of the pixels by using the corresponding context number and arithmetically encoding the current binary block by using the probabilities for all of the pixels to thereby produce the encoded binary shape signal.

BRIEF DESCRIPTION OF THE DRAWINGS

The foregoing and other objects, features and advantages of the present invention will become apparent from the following detailed description of preferred embodiments of the invention with reference to the accompanying drawings, in which:

FIG. 5 describes a current bordered BAB; and

FIG. 6 depicts a bordered motion compensated BAB.

DETAILED DESCRIPTION OF THE PREFERRED EMBODIMENTS

Figure 1:
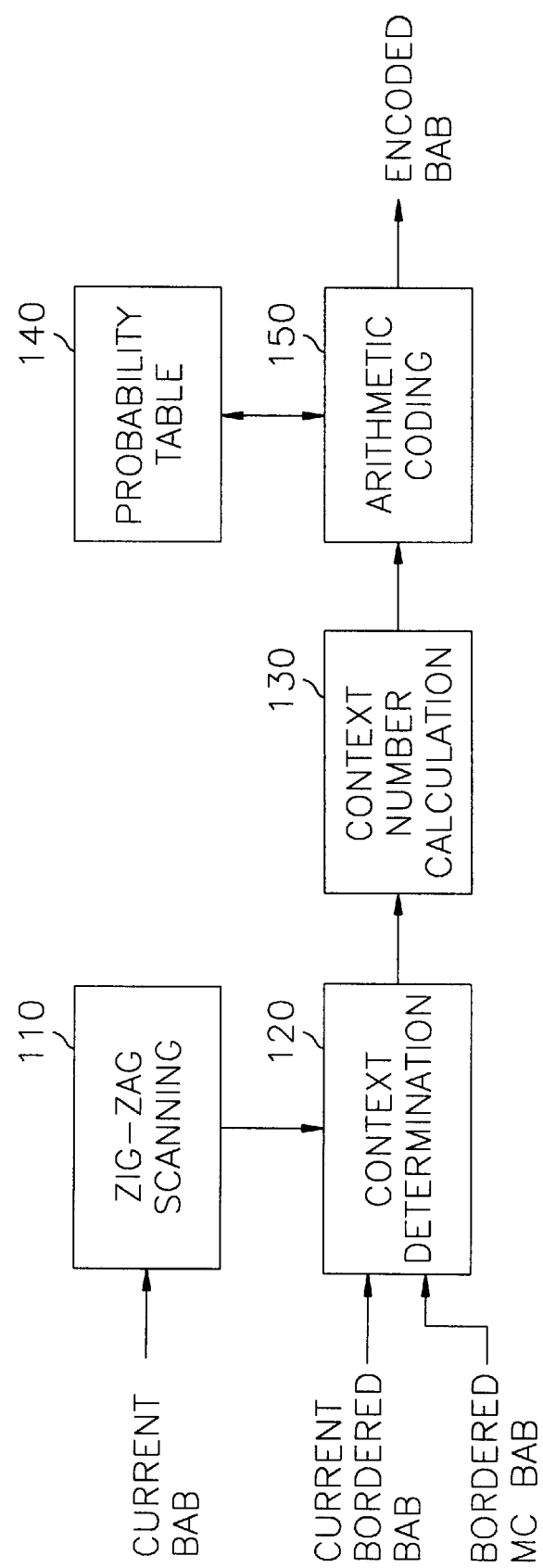
FIG. 1 illustrates a block diagram of a context-based arithmetic encoding apparatus in accordance with the present invention.

Referring to FIG. 1, there is provided a block diagram of a context-based arithmetic encoding (CAE) apparatus in accordance with a preferred embodiment of the present invention.

A binary shape signal contains a plurality of binary alpha blocks (BAB's), each BAB having M×N, e.g., 16×16, binary pixels and each binary pixel including a binary value, e.g., 1 or 0, representing either an object pixel or a background pixel, wherein M and N are positive integers, respectively. Each BAB of the binary shape signal is coupled to a zig-zag scanning block 110 shown in FIG. 1 as a current BAB.

Figure 2:
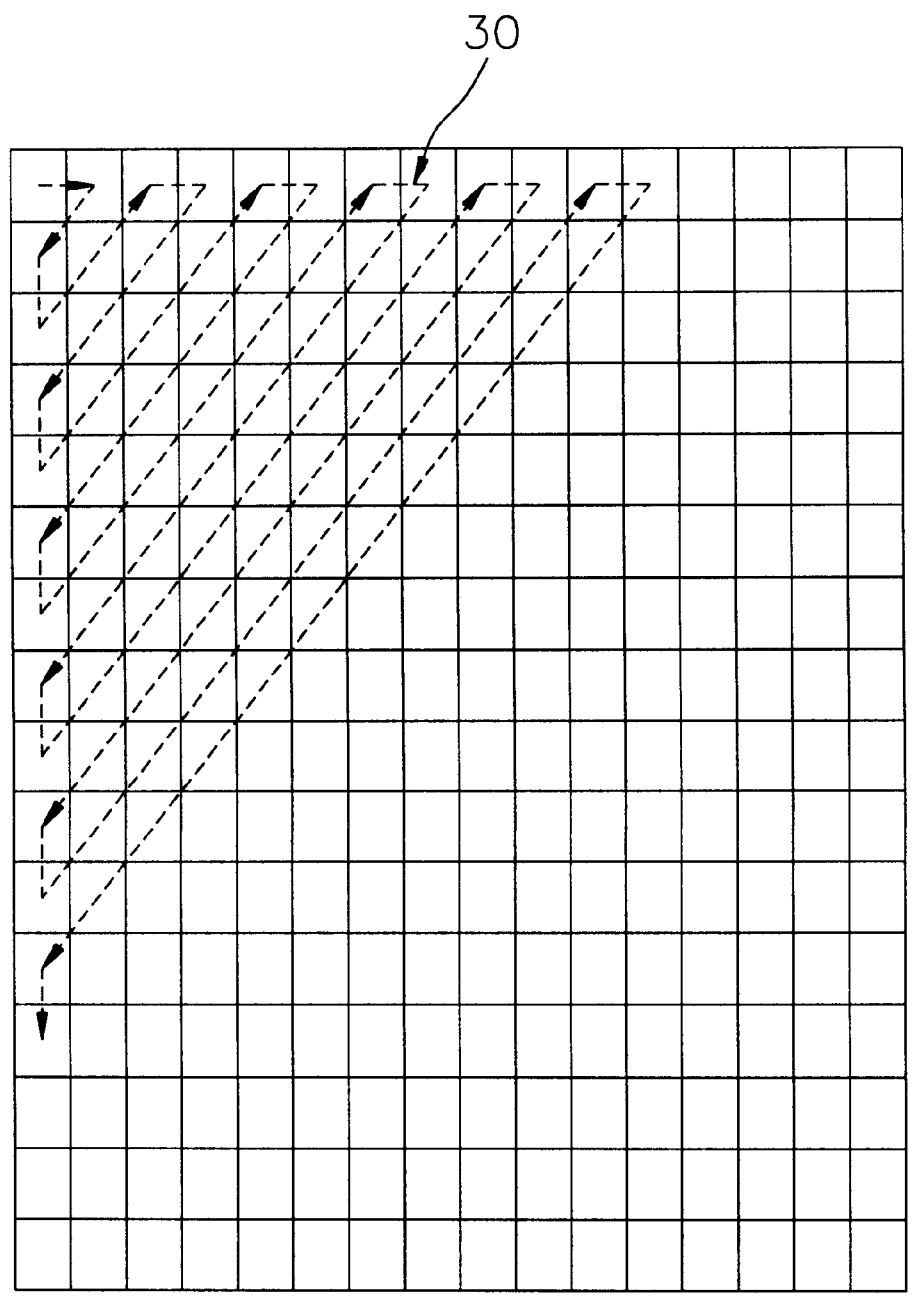
FIG. 2 represents a zig-zag scanning order of a binary alpha block.

As exemplarily described in FIG. 2, the zig-zag scanning block 110 zig-zag scans the current BAB along an arrow 30 and sequentially provides each of the binary pixels in the current BAB as a target pixel to a context determination block 120.

Figure 5:
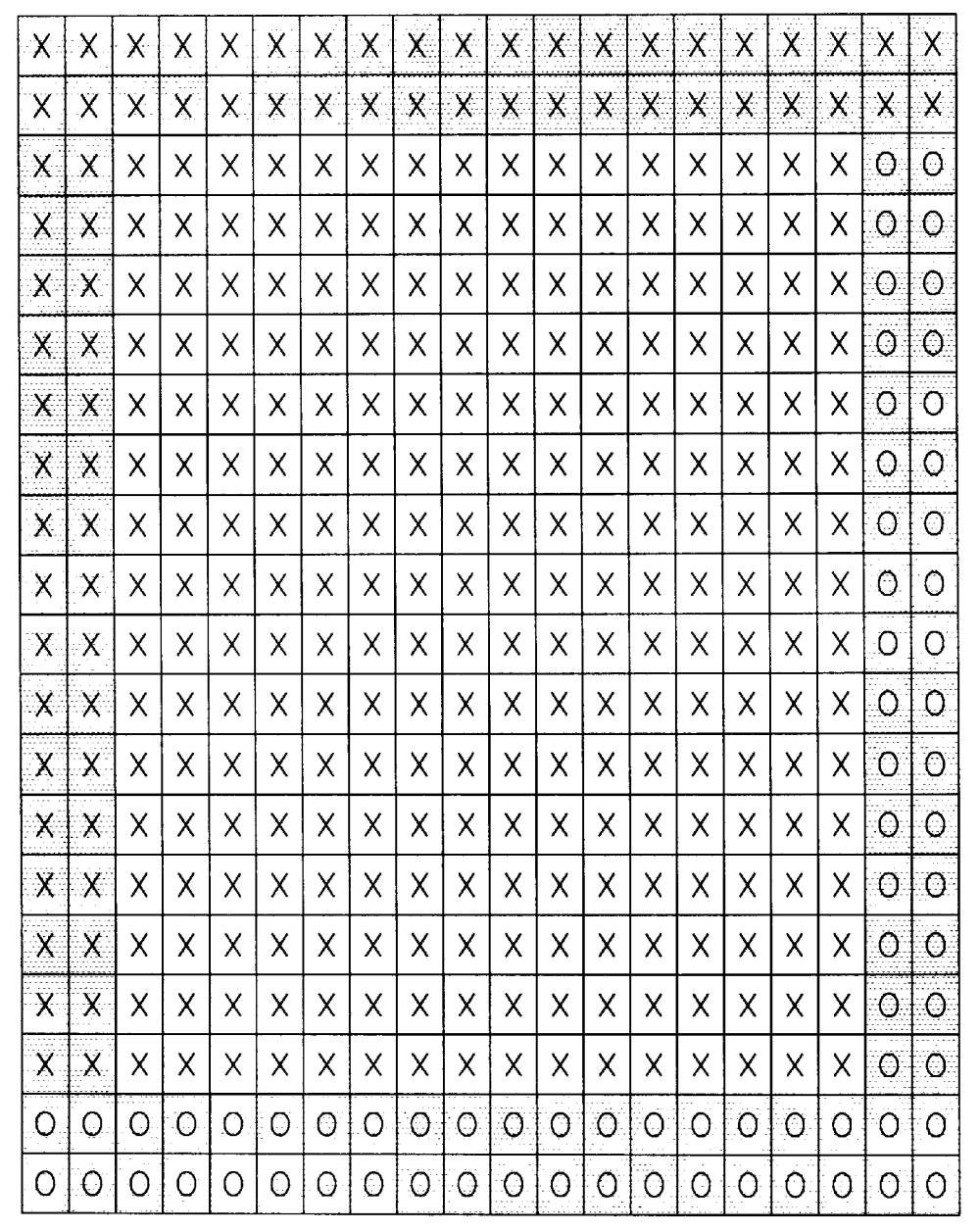
Figure 6:
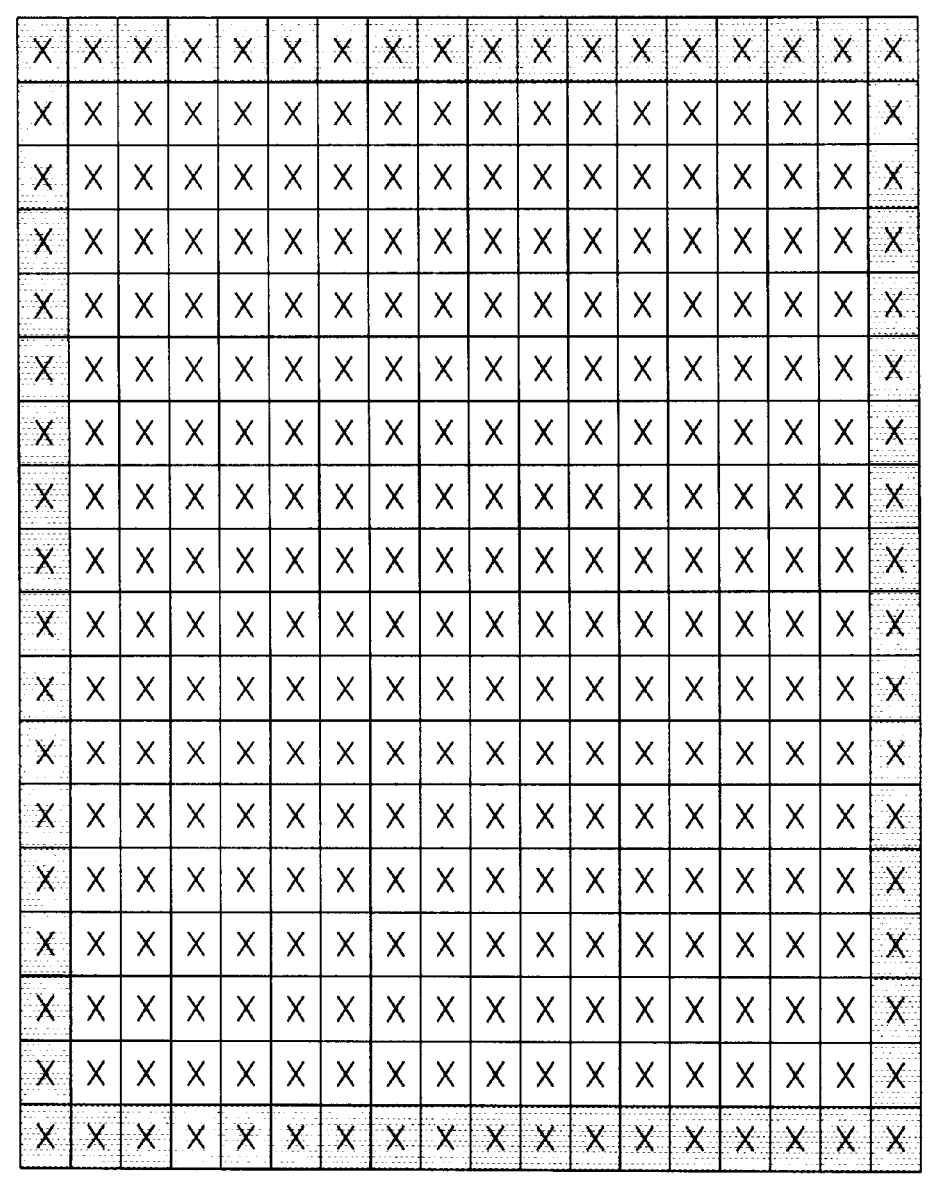

The context determination block 120 selects either an intra-context or inter-context of the target pixel based on a current bordered BAB exemplarily described in FIG. 5 and a bordered MC BAB depicted in FIG. 6.

Figure 3A:
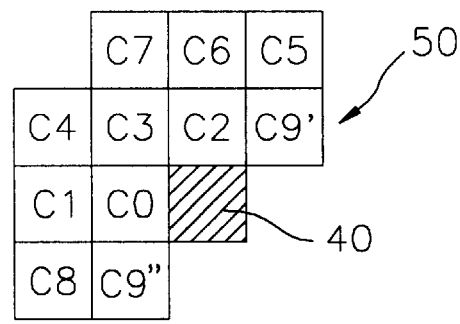
FIGS. 3A and 3B exemplify an intra-context and an inter-context in accordance with the present invention, respectively.
Figure 3B:
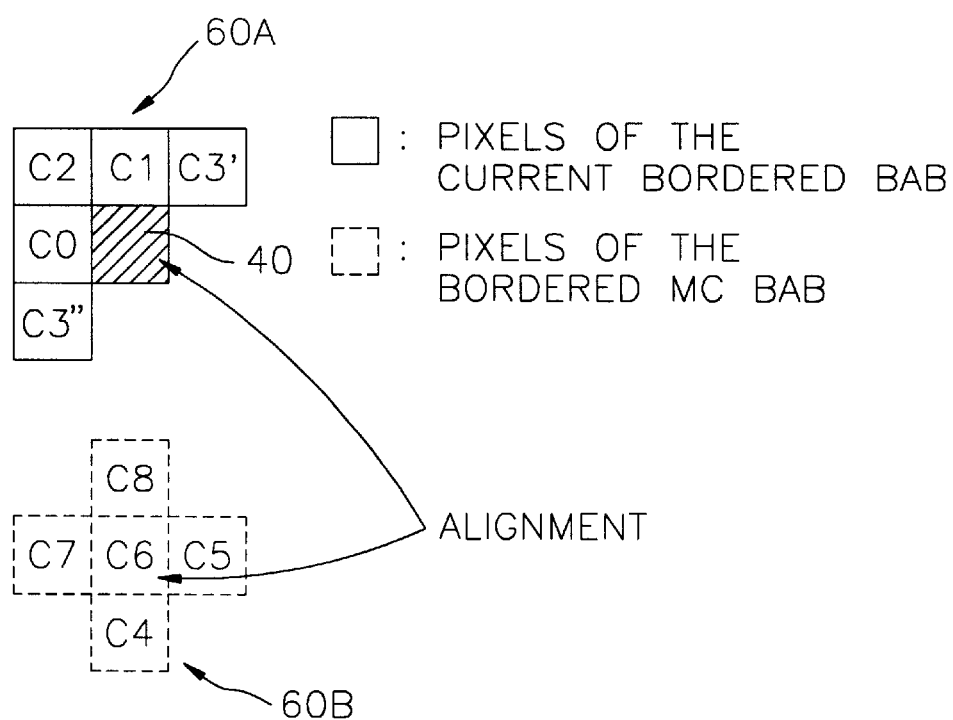

Referring to FIGS. 3A and 3B, there are exemplified the intra-context consisted of a subset 50 and the inter-context consisted of two subsets 60A and 60B in accordance with the present invention, respectively.

The intra-context 50 of the shaded pixel 40, i.e., the target pixel, is determined by using binary pixels in the current bordered BAB which are processed prior to the target pixel and satisfy all conditions described in EQ. 1.

$$|x_k-x_i|+|y_m-y_j|\leq 3, |x_k-x_i|\leq 2 \text{ and } |y_m-y_j|\leq 2 \quad \text{EQ. 1}$$

wherein $x_k$ and $y_m$ represent x and y coordinate of the target pixel in the current bordered BAB, respectively; $x_i$ and $y_j$ show x and y coordinate of a pixel surrounding the target pixel, respectively; and each of k, m, i and j is an integer.

Therefore, in FIG. 3A, the component C9' and C9" are alternatively determined as a member of the intra-context 50 dependent on the scanning order of encoding the current BAB. To be more specific, if the target pixel 40 and its diagonally adjacent pixels, e.g., C9' and C9", are encoded in order of C9', the target pixel 40 and C9" sequentailly along the arrow 30 in FIG. 2, C9' is chosen as a member of the intra-context 50 of the target pixel 40. On the other hand, if the encoding process follows in a sequential order of C9", the target pixel 40 and C9', C9" is selected as a member of the intra-context 50 of the target pixel 40.

Meanwhile, the inter-context of the target pixel 40 is decided by using two subsets of binary pixels. A first subset 60A is determined in a manner similar to that used in deciding the intra-context 50 by using binary pixels in the current bordered BAB which are processed prior to the target pixel and satisfy all conditions illustrated in EQ. 2.

$$|x_k-x_i|\leq 1 \text{ and } |y_m-y_j|\leq 1 \quad \text{EQ. 2}$$

Therefore, in FIG. 3B, the component C3' and C3" are selectively determined as a member of the first subset 60A of the inter-context in the same manner as aforementioned in connection with the intra-context 50. Namely, if the target pixel 40 and its diagonally adjacent pixels, e.g., C3' and C3", are encoded in order of C3', the target pixel 40 and C3" sequentially, C3' is selected as a member of the first subset 60A of the inter-context. On the other hand, the current BAB is scanned in a sequential order of C3", the target pixel 40 and C3', C3" is chosen as a member of the first subset 60A.

In the meantime, a second subset 60B of the inter-context is obtained in the same manner as used in the prior art, i.e., chosen from the bordered MC BAB shown in FIG. 6.

The context, i.e., the intra-context or inter-context, of the target pixel determined as above is coupled to a context number calculation block 130.

Then, the context number calculation block 130 ciphers a context number corresponding to the target pixel in the same manner as that employed in the conventional CAE technique by using its corresponding context, i.e., either the intra-context 50 or the inter-context 60A and 60B, and provides the calculated context number of the target pixel to an arithmetic coding block 150.

The arithmetic coding block 150 detects a probability corresponding to the context number of the target pixel based on a probability table, wherein the probability table is stored in a probability table block 140 and contains predetermined probabilities corresponding to the intra-context 50 and the inter-context 60A and 60B. By using the detected probability for the target pixel representing each of the binary pixels in the current BAB, the arithmetic coding block 150 encodes the current BAB to thereby produce an encoded BAB. The encoded BAB is outputted as an encoded binary shape signal to a transmitter for the transmission thereof.

Figure 4A:
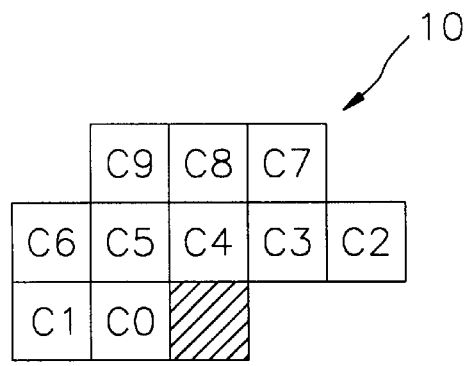
FIGS. 4A and 4B represent a conventional intra-context and inter-context, respectively.
Figure 4B:
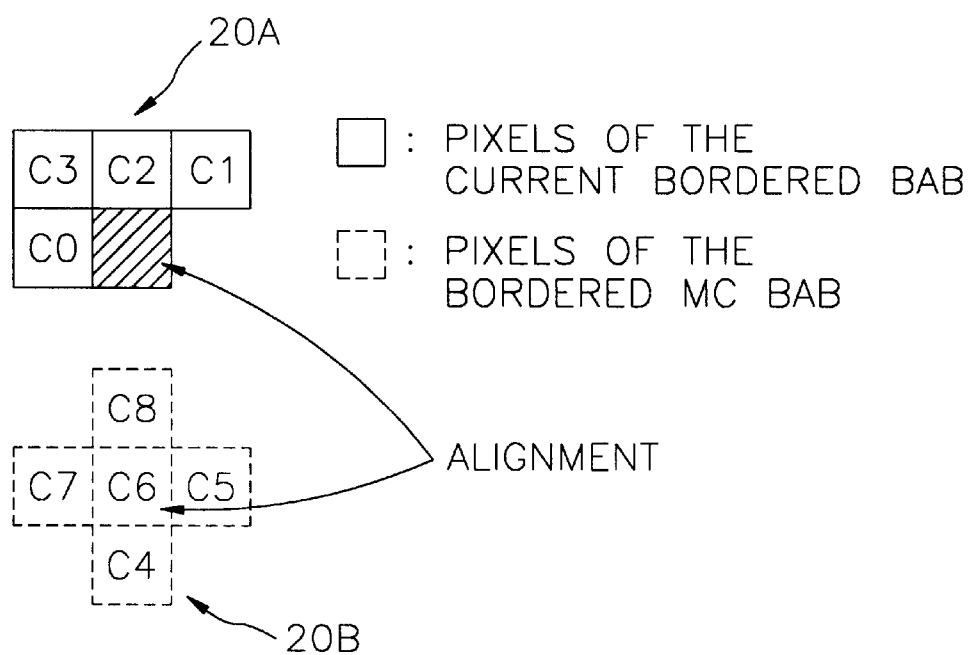

As illustrated above and shown in FIG. 3A, by employing the zig-zag scanning technique in encoding the binary shape signal, the intra-context 50 is determined to further have the members C8 and C9" which are much closer to the target pixel 40 compared with the case in the conventional intra-context, namely, the conventional intra-context 10 including the member C2 shown in FIG. 4A. In this way, the vertical and the horizontal correlation between the pixels in the current BAB can be more effectively taken into account compared with the conventional CAE technique so that the binary shape signal will be more accurately encoded. Accordingly, in accordance with the present invention, the coding efficiency of the binary shape signal can be further enhanced.

While the present invention has been described with respect to the particular embodiments, it will be apparent to those skilled in the art that various changes and modifications may be made without departing from the spirit and scope of the invention as defined in the following claims.

What is claimed is:

1. A method for encoding a binary shape signal including a plurality of binary blocks, each binary block having a multiplicity of pixels and each pixel having one of two different binary values, comprising the steps of:

(a) zig-zag scanning a current binary block to provide a target pixel, the target pixel being one of the pixels in the current binary block;

(b) determining a context corresponding to the target pixel from pixels processed prior to the target pixel by taking the scanning result into account;

(c) calculating a context number of the target pixel based on the context;

(d) finding a probability of the target pixel by using the context number;

(e) repeating the steps (a) to (d) until probabilities for all of the pixels in the current binary block are found; and (f) arithmetically encoding the current binary block by using the probabilities for all of the pixels to thereby produce the encoded binary shape signal, wherein an intra-context corresponding to the target pixel is determined by using pixels in a current bordered binary block which are processed prior to the target pixel and satisfy all conditions as:

$|x_k-x_i|+|y_m-y_j| \leq 3$, $|x_k-x_i| \leq 2$ and $|y_m-y_j| \leq 2$, wherein $x_k$ and $y_m$ represent x and y coordinate of the target pixel in the current bordered binary block, respectively, $x_i$ and $y_j$ show x and y coordinate of a pixel surrounding the target pixel, respectively; each of k, m, i and j is an integer; and the current bordered binary block is made of the current binary block with a border of width 2 therearound, the border containing pixels selected from neighboring binary blocks of the current binary block in the binary shape signal.

2. An apparatus for encoding a binary shape signal including a plurality of binary blocks, each binary block having a multiplicity of pixels and each pixel having one of two different binary values, which comprises:

means for zig-zag scanning a current binary block and outputting each of the pixels in the current binary block sequentially in order of scanning;

means for selecting a context corresponding to said each of the pixels from pixels processed prior to said each of the pixels by taking account of the scanning order;

means for ciphering a context number of said each of the pixels by using the corresponding context;

means for detecting a probability of said each of the pixels by using the corresponding context number; and means for arithmetically encoding the current binary block by using the probabilities for all of the pixels in the current binary block to thereby produce the encoded binary shape signal, wherein an intra-context corresponding to said each of the pixels is decided by using pixels in a current bordered binary block which are processed prior to said each of the pixels and satisfy all conditions as:

$|x_k-x_i|+|y_m-y_j| \leq 3$, $|x_k-x_i| \leq 2$ and $|y_m-y_j| \leq 2$, wherein $x_k$ and $y_m$ represent x and y coordinate of the target pixel in the current bordered binary block, respectively; $x_i$ and $y_j$ show x and y coordinate of a pixel surrounding the target pixel, respectively; each of k, m, i and j is an integer; and the current bordered binary block is made of the current binary block with a border of width 2 therearound, the border containing pixels selected from neighboring binary blocks of the current binary block in the binary shape signal.

* * * * *